United States Patent [19]

Chavez, Jr.

[11] Patent Number: 5,521,962
[45] Date of Patent: May 28, 1996

[54] TEMPORARY STORAGE OF AUTHENTICATION INFORMATION THROUGHOUT A PERSONAL COMMUNICATION SYSTEM

[75] Inventor: David L. Chavez, Jr., Thornton, Colo.

[73] Assignee: AT&T Corp., Murray Hill, N.J.

[21] Appl. No.: 268,482

[22] Filed: Jun. 30, 1994

[51] Int. Cl.[6] .................................................. H04Q 7/38
[52] U.S. Cl. .............................. 379/60; 379/59; 455/33.2
[58] Field of Search ...................... 379/59, 60; 455/33.1, 455/33.2, 54.1

[56] References Cited

U.S. PATENT DOCUMENTS

| 4,876,738 | 10/1989 | Selby | 455/54.1 |
|---|---|---|---|
| 4,980,907 | 12/1990 | Raith et al. | 379/63 |
| 5,040,177 | 8/1991 | Martin et al. | 370/110.1 |
| 5,182,751 | 1/1993 | Bales et al. | 370/110.1 |
| 5,202,912 | 4/1993 | Breeden et al. | 379/57 |
| 5,212,822 | 5/1993 | Fukumine et al. | 455/33.2 |
| 5,222,123 | 6/1993 | Brown et al. | 379/57 |
| 5,402,471 | 3/1995 | Van Nielen | 379/60 |

FOREIGN PATENT DOCUMENTS 9401976  1/1994  WIPO .

Primary Examiner—Dwayne D. Bost
Attorney, Agent, or Firm—John C. Moran

[57] ABSTRACT

Allowing multiple copies of authentication information for a mobile telephone to exist in switching nodes of a distributed switching system. The mobile telephone is only registered on one switching node at a time. One copy is maintained on the resident switching node, and another copy is maintained on the switching node on which the mobile telephone was last registered other than the resident switching node. If the mobile telephone normal only registers on the resident switching node and one other switching node, the authentication information is present on both switching nodes, and both always have the authentication information to register the mobile telephone stored internally which speeds up the registration process. Further, the authentication information does not have to be repeatly communicated through the distributed switching system. If the switching nodes are arranged into an authentication hierarchical structure, the authentication information remains stored on a switching node that last used the authentication information within the authentication hierarchical structure, so that all switching nodes in that authentication hierarchical structure can access the authentication information.

10 Claims, 18 Drawing Sheets

NODE HIERARCHY

DIALING PLAN HIERARCHY

FIG. 5

MOBILITY TABLE 501 FOR NODE 108

| TEL # | STATE | NODE # | NODE POINTER | AUTH POINTER | TIME |
|---|---|---|---|---|---|
| 3130 | 1 | 108 | 0 | POINTER | |
| : | : | : | : | : | |
| 4401 | 1 | 108 | 0 | POINTER | |

512

DIALING PLAN TABLE 502 FOR NODE 108

| TEL # | NODE # | OWNERSHIP | STATUS |
|---|---|---|---|
| 31XX | 106 | 1 | 1 |
| : | : | : | : |
| 4401 | 102 | 1 | 1 |

513

LEVEL 5 ROUTING TABLE 503 FOR NODE 108

| TEL # | NODE |
|---|---|
| 31XX | 108 |
| 1XXX | 101 |
| 3130 | MMA |
| 4401 | MMA |
| 22XX | 104 |

514

LEVEL 4 ROUTING TABLE 504 FOR NODE 108

| NODE # | LDC OF # OF HOPS | |
|---|---|---|
| 106 | 163 | 1 |
| 101 | 163 | 3 |
| 104 | 163 | 4 |
| : | : | : |
| NMS | 163 | 3 |
| 110 | 163 | 5 |

515

☐ HIERARCHICAL STATE WORD 505 FOR NODE 108

MOBILITY TABLE 506 FOR NODE 102

| TEL # | STATE | NODE # | NODE POINTER | AUTH POINTER | TIME |
|---|---|---|---|---|---|
| 4430 | 1 | 102 | 0 | POINTER | |

DIALING PLAN TABLE 507 FOR NODE 102

| TEL # | NODE # | OWNERSHIP | STATUS |
|---|---|---|---|
| 1XXX | 101 | 2 | 1 |
| 2XXX | 104 | 2 | 1 |
| 3XXX | 106 | 2 | 1 |
| : | : | : | : |
| 4401 | 108 | 2 | 1 |
| 4XXX | 102 | 1 | 1 |

LEVEL 5 ROUTING TABLE 508 FOR NODE 102

| TEL # | NODE |
|---|---|
| 1XXX | 101 |
| 2XXX | 104 |
| 3XXX | 106 |
| : | : |
| 4401 | 108 |
| 44XX | 102 |
| 4430 | MMA |

LEVEL 4 ROUTING TABLE 509 FOR NODE 102

| NODE # | LDC OF # OF HOPS | |
|---|---|---|
| 101 | 150 | 1 |
| 106 | 160 | 1 |
| 104 | 150 | 2 |
| NMS | 148 | 1 |
| 108 | 160 | 2 |

☐ 1 HIERARCHICAL STATE WORD 510 FOR NODE 102

FIG. 6

MOBILITY TABLE 601 FOR NODE 101

| TEL # | STATE | NODE # | NODE POINTER | AUTH POINTER | TIME | ACTIVITY |
|---|---|---|---|---|---|---|
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |

☐ HIERARCHICAL STATE WORD 605 FOR NODE 101

DIALING PLAN TABLE 602 FOR NODE 101

| TEL # | NODE # | OWNERSHIP | STATUS |
|---|---|---|---|
| 1XXX | 102 | 1 | 1 |
| 10XX | 105 | 2 | 1 |
| 11XX | 112 | 2 | 1 |
| 12XX | 111 | 2 | 1 |

LEVEL 5 ROUTING TABLE 603 FOR NODE 101

| TEL # | NODE |
|---|---|
| 1XXX | 101 |
| : | : |
| 3XXX | 106 |
| 31XX | 108 |
| 2XXX | 104 |
| 20XX | 109 |
| 21XX | 110 |
| : | : |
| XXXX | 102 |

LEVEL 4 ROUTING TABLE 604 FOR NODE 101

| NODE # | LDC OF | # OF HOPS |
|---|---|---|
| 102 | 150 | 1 |
| : | : | : |
| 106 | 150 | 2 |
| 108 | 150 | 3 |
| 104 | 155 | 1 |
| 109 | 155 | 2 |
| 110 | 155 | 2 |
| NMS | 150 | 2 |

MOBILITY TABLE 606 FOR NODE 104

| TEL # | STATE | NODE # | NODE POINTER | AUTH POINTER | TIME | ACTIVITY |
|---|---|---|---|---|---|---|
| 2230 | 1 | 104 | 0 | POINTER |  |  |
|  |  |  |  |  |  |  |
|  |  |  |  |  |  |  |
|  |  |  |  |  |  |  |
|  |  |  |  |  |  |  |
|  |  |  |  |  |  |  |

☐ HIERARCHICAL STATE WORD 610 FOR NODE 104

DIALING PLAN TABLE 607 FOR NODE 104

| TEL # | NODE # | OWNERSHIP | STATUS |
|---|---|---|---|
| 2XXX | 102 | 1 | 1 |
| 20XX | 109 | 2 | 1 |
| 21XX | 110 | 2 | 1 |

LEVEL 5 ROUTING TABLE 608 FOR NODE 104

| TEL # | NODE |
|---|---|
| 20XX | 109 |
| 21XX | 110 |
| 31XX | 108 |
| 2230 | MMA |
| 22XX | 104 |

LEVEL 4 ROUTING TABLE 609 FOR NODE 104

| NODE # | LDC OF | # OF HOPS |
|---|---|---|
| 102 | 155 | 2 |
| 109 | 158 | 1 |
| 110 | 159 | 1 |
| 101 | 155 | 1 |
| 108 | 155 | 4 |
| NMS | 155 | 3 |

FIG. 7

MOBILITY TABLE 701 FOR NODE 109

| TEL # | STATE | NODE # | NODE POINTER | AUTH POINTER | TIME | ACTIVITY |
|---|---|---|---|---|---|---|
| 2030 | 1 | 109 | 0 | POINTER | | |
| | | | | | | |
| | | | | | | |
| | | | | | | |
| | | | | | | |

☐ 1 HIERARCHICAL STATE WORD 705 FOR NODE 109

DIALING PLAN TABLE 702 FOR NODE 109

| TEL # | NODE # | OWNERSHIP | STATUS |
|---|---|---|---|
| 20XX | 104 | 2 | 1 |
| | | | |
| | | | |
| | | | |
| | | | |

LEVEL 5 ROUTING TABLE 703 FOR NODE 109

| TEL # | NODE |
|---|---|
| 20XX | 109 |
| 31XX | 108 |
| : | : |
| 22XX | 104 |
| 21XX | |
| 2030 | MMA |

LEVEL 4 ROUTING TABLE 704 FOR NODE 109

| NODE # | LDC OF | # OF HOPS |
|---|---|---|
| 104 | 158 | 1 |
| 108 | 158 | 5 |
| : | : | : |
| NMS | 158 | 4 |
| | | |
| | | |

MOBILITY TABLE 706 FOR NODE 110

| TEL # | STATE | NODE # | NODE POINTER | AUTH POINTER | TIME | ACTIVITY |
|---|---|---|---|---|---|---|
| 2130 | 1 | 110 | 0 | POINTER | | |
| | | | | | | |
| | | | | | | |
| | | | | | | |
| | | | | | | |

☐ 1 HIERARCHICAL STATE WORD 710 FOR NODE 110

DIALING PLAN TABLE 707 FOR NODE 110

| TEL # | NODE # | OWNERSHIP | STATUS |
|---|---|---|---|
| 21XX | 104 | 2 | 1 |
| | | | |
| | | | |
| | | | |
| | | | |

LEVEL 5 ROUTING TABLE 608 FOR NODE 110

| TEL # | NODE |
|---|---|
| 21XX | 110 |
| 31XX | 108 |
| : | : |
| 22XX | 104 |
| 2130 | MMA |

LEVEL 4 ROUTING TABLE 709 FOR NODE 110

| NODE # | LDC OF | # OF HOPS |
|---|---|---|
| 104 | 159 | 1 |
| 108 | 159 | 5 |
| : | : | : |
| NMS | 159 | 3 |
| | | |
| | | |

FIG. 8

DIALING PLAN TABLE 802 FOR NODE 106

| TEL # | NODE # | OWNERSHIP | STATUS |
|---|---|---|---|
| 3XXX | 102 | 1 | 1 |
| 30XX | 107 | 2 | 1 |
| 31XX | 108 | 2 | 1 |

LEVEL 5 ROUTING TABLE 803 FOR NODE 106

| TEL # | NODE |
|---|---|
| 30XX | 107 |
| 31XX | 108 |
| 44XX | 102 |
| 3230 | MMA |

LEVEL 4 ROUTING TABLE 804 FOR NODE 106

| NODE # | LDC OF | # OF HOPS |
|---|---|---|
| 102 | 161 | 1 |
| 107 | 162 | 1 |
| 108 | 163 | 1 |
| NMS | 161 | 2 |

MOBILITY TABLE 801 FOR NODE 106

| TEL # | STATE | NODE # | NODE POINTER | AUTH POINTER | TIME | ACTIVITY |
|---|---|---|---|---|---|---|
| 3230 | 1 | 106 | 0 | POINTER | | |
| | | | | | | |
| | | | | | | |
| | | | | | | |

| 1 | HIERARCHICAL STATE WORD 805 FOR NODE 106

FIG. 9

MOBILITY TABLE 706 FOR NODE 110

| TEL # | STATE | NODE # | NODE POINTER | AUTH POINTER | TIME | ACTIVITY |
|---|---|---|---|---|---|---|
| 2130 | 1 | 110 | 0 | POINTER | : | : |
| : | : | : | : | : | : | : |
| 4401 | 1 | 108 | 0 | POINTER | | |
| | | | | | | |

901

| 1 | HIERARCHICAL STATE WORD 710 FOR NODE 110

MOBILITY TABLE 501 FOR NODE 108

| TEL # | STATE | NODE # | NODE POINTER | AUTH POINTER | TIME | ACTIVITY |
|---|---|---|---|---|---|---|
| 3130 | 1 | 108 | 0 | POINTER | : | : |
| : | : | : | : | : | : | : |
| 4401 | 0 | 110 | 0 | POINTER | | |
| | | | | | | |

512

| 1 | HIERARCHICAL STATE WORD 505 FOR NODE 108

FIG. 10

MOBILITY TABLE 601
FOR NODE 101

| TEL # | STATE | NODE # | NODE POINTER | AUTH POINTER | TIME | ACTIVITY |
|---|---|---|---|---|---|---|
| 2230 | 2 | 104 | 104 | POINTER | | |
| 2030 | 2 | 109 | 104 | POINTER | | |
| 2130 | 2 | 110 | 104 | POINTER | | |
| | | | | | | |
| | | | | | | |
| | | | | | | |

[ 1 ] HIERARCHICAL STATE WORD 605 FOR NODE 101

MOBILITY TABLE 606
FOR NODE 104

| TEL # | STATE | NODE # | NODE POINTER | AUTH POINTER | TIME | ACTIVITY |
|---|---|---|---|---|---|---|
| 2230 | 1 | 104 | 0 | POINTER | | |
| 2030 | 2 | 109 | 109 | POINTER | | |
| 2130 | 2 | 110 | 110 | POINTER | | |
| | | | | | | |
| | | | | | | |
| | | | | | | |

[ 0 ] HIERARCHICAL STATE WORD 610 FOR NODE 104

MOBILITY TABLE 701
FOR NODE 109

| TEL # | STATE | NODE # | NODE POINTER | AUTH POINTER | TIME | ACTIVITY |
|---|---|---|---|---|---|---|
| 2030 | 1 | 109 | 0 | POINTER | | |
| | | | | | | |
| | | | | | | |
| | | | | | | |
| | | | | | | |
| | | | | | | |

[ 0 ] HIERARCHICAL STATE WORD 705 FOR NODE 109

MOBILITY TABLE 706
FOR NODE 110

| TEL # | STATE | NODE # | NODE POINTER | AUTH POINTER | TIME | ACTIVITY |
|---|---|---|---|---|---|---|
| 2130 | 1 | 110 | 0 | POINTER | | |
| | | | | | | |
| | | | | | | |
| | | | | | | |
| | | | | | | |
| | | | | | | |

[ 0 ] HIERARCHICAL STATE WORD 710 FOR NODE 110

FIG. 11

MOBILITY TABLE 601 FOR NODE 101

| TEL # | STATE | NODE # | NODE POINTER | AUTH POINTER | TIME | ACTIVITY |
|---|---|---|---|---|---|---|
| 2230 | 2 | 104 | 104 | POINTER | | |
| 2030 | 2 | 109 | 104 | POINTER | | |
| 2130 | 2 | 110 | 104 | POINTER | | |
| : | : | : | : | : | : | : |
| 4401 | 2 | 108 | 104 | POINTER | | |

[ 1 ] HIERARCHICAL STATE WORD 605 FOR NODE 101

1103

MOBILITY TABLE 606 FOR NODE 104

| TEL # | STATE | NODE # | NODE POINTER | AUTH POINTER | TIME | ACTIVITY |
|---|---|---|---|---|---|---|
| 2230 | 1 | 104 | 0 | POINTER | | |
| 2030 | 2 | 109 | 109 | POINTER | | |
| 2130 | 2 | 110 | 110 | POINTER | | |
| : | : | : | : | : | : | : |
| 4401 | 2 | 108 | 110 | POINTER | | |

[ 0 ] HIERARCHICAL STATE WORD 610 FOR NODE 104

1102

MOBILITY TABLE 701 FOR NODE 109

| TEL # | STATE | NODE # | NODE POINTER | AUTH POINTER | TIME | ACTIVITY |
|---|---|---|---|---|---|---|
| 2030 | 1 | 109 | 0 | POINTER | | |

[ 0 ] HIERARCHICAL STATE WORD 705 FOR NODE 109

MOBILITY TABLE 706 FOR NODE 110

| TEL # | STATE | NODE # | NODE POINTER | AUTH POINTER | TIME | ACTIVITY |
|---|---|---|---|---|---|---|
| 2130 | 1 | 110 | 0 | POINTER | : | : |
| : | : | : | : | : | : | : |
| 4401 | 1 | 108 | 0 | POINTER | | |

[ 0 ] HIERARCHICAL STATE WORD 710 FOR NODE 110

MOBILITY TABLE 601 FOR NODE 101

| TEL # | STATE | NODE # | NODE POINTER | AUTH POINTER | TIME | ACTIVITY |
|---|---|---|---|---|---|---|
| 2230 | 2 | 104 | 104 | POINTER | | |
| 2030 | 2 | 109 | 104 | POINTER | | |
| 2130 | 2 | 110 | 104 | POINTER | | |
| : | : | : | : | : | : | : |
| 4401 | 2 | 108 | 104 | POINTER | | |
| | | | | | | |

1101

`[ 1 ]` HIERARCHICAL STATE WORD 605 FOR NODE 101

MOBILITY TABLE 606 FOR NODE 104

| TEL # | STATE | NODE # | NODE POINTER | AUTH POINTER | TIME | ACTIVITY |
|---|---|---|---|---|---|---|
| 2230 | 1 | 104 | 0 | POINTER | | |
| 2030 | 2 | 109 | 109 | POINTER | | |
| 2130 | 2 | 110 | 110 | POINTER | | |
| : | : | : | : | : | : | : |
| 4401 | 2 | 108 | 109 | POINTER | | |
| | | | | | | |

1202

`[ 0 ]` HIERARCHICAL STATE WORD 610 FOR NODE 104

MOBILITY TABLE 701 FOR NODE 109

| TEL # | STATE | NODE # | NODE POINTER | AUTH POINTER | TIME | ACTIVITY |
|---|---|---|---|---|---|---|
| 2030 | 1 | 109 | 0 | POINTER | | |
| : | : | : | : | : | : | : |
| 4401 | 1 | 108 | 0 | POINTER | | |
| | | | | | | |

1201

`[ 0 ]` HIERARCHICAL STATE WORD 705 FOR NODE 109

MOBILITY TABLE 706 FOR NODE 110

| TEL # | STATE | NODE # | NODE POINTER | AUTH POINTER | TIME | ACTIVITY |
|---|---|---|---|---|---|---|
| 2130 | 1 | 110 | 0 | POINTER | | |
| | | | | | | |

`[ 0 ]` HIERARCHICAL STATE WORD 710 FOR NODE 110

FIG. 13

MOBILITY TABLE 601
FOR NODE 101

| TEL # | STATE | NODE # | NODE POINTER | AUTH POINTER | TIME | ACTIVITY |
|-------|-------|--------|--------------|--------------|------|----------|
| 2230  | 2     | 104    | 104          | 0            |      |          |
| 2030  | 2     | 109    | 104          | 0            |      |          |
| 2130  | 2     | 110    | 104          | 0            |      |          |
| ..    | ..    | ..     | ..           | ..           | ..   | ..       |
| 4401  | 2     | 108    | 104          | 0            |      |          |

[1] HIERARCHICAL STATE WORD 605 FOR NODE 101

MOBILITY TABLE 606
FOR NODE 104

| TEL # | STATE | NODE # | NODE POINTER | AUTH POINTER | TIME | ACTIVITY |
|-------|-------|--------|--------------|--------------|------|----------|
| 2230  | 1     | 104    | 0            | POINTER      |      |          |
| 2030  | 2     | 109    | 109          | 0            |      |          |
| 2130  | 2     | 110    | 110          | 0            |      |          |
| ..    | ..    | ..     | ..           | ..           | ..   | ..       |
| 4401  | 2     | 108    | 110          | 0            |      |          |

[0] HIERARCHICAL STATE WORD 610 FOR NODE 104

1302

MOBILITY TABLE 701
FOR NODE 109

| TEL # | STATE | NODE # | NODE POINTER | AUTH POINTER | TIME | ACTIVITY |
|-------|-------|--------|--------------|--------------|------|----------|
| 2030  | 1     | 109    | 0            | POINTER      |      |          |

[0] HIERARCHICAL STATE WORD 705 FOR NODE 109

MOBILITY TABLE 706
FOR NODE 110

| TEL # | STATE | NODE # | NODE POINTER | AUTH POINTER | TIME | ACTIVITY |
|-------|-------|--------|--------------|--------------|------|----------|
| 2130  | 1     | 110    | 0            | POINTER      | ..   | ..       |
| ..    | ..    | ..     | ..           | ..           | ..   | ..       |
| 4401  | 1     | 108    | 0            | POINTER      |      |          |

[0] HIERARCHICAL STATE WORD 710 FOR NODE 110

MOBILITY TABLE 601 FOR NODE 101

| TEL # | STATE | NODE # | NODE POINTER | AUTH POINTER | TIME | ACTIVITY |
|-------|-------|--------|--------------|--------------|------|----------|
| 2230  | 2     | 104    | 104          | 0            |      |          |
| 2030  | 2     | 109    | 104          | 0            |      |          |
| 2130  | 2     | 110    | 104          | 0            |      |          |
| :     | :     | :      | :            | :            | :    | :        |
| 4401  | 2     | 108    | 104          | 0            |      |          |

| 1 | HIERARCHICAL STATE WORD 605 FOR NODE 101

MOBILITY TABLE 606 FOR NODE 104

| TEL # | STATE | NODE # | NODE POINTER | AUTH POINTER | TIME | ACTIVITY |
|-------|-------|--------|--------------|--------------|------|----------|
| 2230  | 1     | 104    | 0            | POINTER      |      |          |
| 2030  | 2     | 109    | 109          | 0            |      |          |
| 2130  | 2     | 110    | 110          | 0            |      |          |
| :     | :     | :      | :            | :            | :    | :        |
| 4401  | 2     | 108    | 109          | POINTER      |      |          |

| 0 | HIERARCHICAL STATE WORD 610 FOR NODE 104

1402

MOBILITY TABLE 701 FOR NODE 109

| TEL # | STATE | NODE # | NODE POINTER | AUTH POINTER | TIME | ACTIVITY |
|-------|-------|--------|--------------|--------------|------|----------|
| 2030  | 1     | 109    | 0            | POINTER      |      |          |
| :     | :     | :      | :            | :            | :    | :        |
| 4401  | 1     | 108    | 0            | POINTER      |      |          |

| 0 | HIERARCHICAL STATE WORD 705 FOR NODE 109

1401

MOBILITY TABLE 706 FOR NODE 110

| TEL # | STATE | NODE # | NODE POINTER | AUTH POINTER | TIME | ACTIVITY |
|-------|-------|--------|--------------|--------------|------|----------|
| 2130  | 1     | 110    | 0            | POINTER      |      |          |

| 0 | HIERARCHICAL STATE WORD 710 FOR NODE 110

FIG. 15

MOBILITY TABLE 601 FOR NODE 101

| TEL # | STATE | NODE # | NODE POINTER | AUTH POINTER | TIME | ACTIVITY |
|-------|-------|--------|--------------|--------------|------|----------|
| 2230  | 2     | 104    | 104          | 0            |      |          |
| 2030  | 2     | 109    | 104          | 0            |      |          |
| 2130  | 2     | 110    | 104          | 0            |      |          |
| ..    | ..    | ..     | ..           | ..           | ..   | ..       |
| 4401  | 2     | 108    | 104          | POINTER      |      |          |

1503

`[1]` HIERARCHICAL STATE WORD 605 FOR NODE 101

MOBILITY TABLE 606 FOR NODE 104

| TEL # | STATE | NODE # | NODE POINTER | AUTH POINTER | TIME | ACTIVITY |
|-------|-------|--------|--------------|--------------|------|----------|
| 2230  | 1     | 104    | 0            | POINTER      |      |          |
| 2030  | 2     | 109    | 109          | 0            |      |          |
| 2130  | 2     | 110    | 110          | 0            |      |          |
| ..    | ..    | ..     | ..           | ..           | ..   | ..       |
| 4401  | 2     | 108    | 110          | 0            |      |          |

1502

`[0]` HIERARCHICAL STATE WORD 610 FOR NODE 104

MOBILITY TABLE 701 FOR NODE 109

| TEL # | STATE | NODE # | NODE POINTER | AUTH POINTER | TIME | ACTIVITY |
|-------|-------|--------|--------------|--------------|------|----------|
| 2030  | 1     | 109    | 0            | POINTER      |      |          |

`[0]` HIERARCHICAL STATE WORD 705 FOR NODE 109

MOBILITY TABLE 706 FOR NODE 110

| TEL # | STATE | NODE # | NODE POINTER | AUTH POINTER | TIME | ACTIVITY |
|-------|-------|--------|--------------|--------------|------|----------|
| 2130  | 1     | 110    | 0            | POINTER      |      | ..       |
| ..    | ..    | ..     | ..           | ..           | ..   |          |
| 4401  | 1     | 108    | 0            | 0            |      | ..       |

1501

`[0]` HIERARCHICAL STATE WORD 710 FOR NODE 110

FIG. 16

MOBILITY TABLE 601
FOR NODE 101

| TEL # | STATE | NODE # | NODE POINTER | AUTH POINTER | TIME | ACTIVITY |
|---|---|---|---|---|---|---|
| 2230 | 2 | 104 | 104 | 0 | | |
| 2030 | 2 | 109 | 104 | 0 | | |
| 2130 | 2 | 110 | 104 | 0 | | |
| : | : | : | : | : | : | : |
| 4401 | 2 | 108 | 104 | POINTER | | |

1603

| 1 | HIERARCHICAL STATE WORD 605 FOR NODE 101 |

MOBILITY TABLE 606
FOR NODE 104

| TEL # | STATE | NODE # | NODE POINTER | AUTH POINTER | TIME | ACTIVITY |
|---|---|---|---|---|---|---|
| 2230 | 1 | 104 | 0 | POINTER | | |
| 2030 | 2 | 109 | 109 | 0 | | |
| 2130 | 2 | 110 | 110 | 0 | | |
| : | : | : | : | : | : | : |
| 4401 | 2 | 108 | 109 | POINTER | | |

1602

| 0 | HIERARCHICAL STATE WORD 610 FOR NODE 104 |

MOBILITY TABLE 701
FOR NODE 109

| TEL # | STATE | NODE # | NODE POINTER | AUTH POINTER | TIME | ACTIVITY |
|---|---|---|---|---|---|---|
| 2030 | 1 | 109 | 0 | POINTER | | |
| : | : | : | : | : | : | : |
| 4401 | 1 | 108 | 0 | POINTER | | |

1601

| 0 | HIERARCHICAL STATE WORD 705 FOR NODE 109 |

MOBILITY TABLE 706
FOR NODE 110

| TEL # | STATE | NODE # | NODE POINTER | AUTH POINTER | TIME | ACTIVITY |
|---|---|---|---|---|---|---|
| 2130 | 1 | 110 | 0 | POINTER | | |

| 0 | HIERARCHICAL STATE WORD 710 FOR NODE 110 |

BASE STATION 130

TEMPORARY STORAGE OF AUTHENTICATION INFORMATION THROUGHOUT A PERSONAL COMMUNICATION SYSTEM

TECHNICAL FIELD

This invention relates to a mobile telephone and, in particular, to providing rapid telephone registration in a distributed telecommunication switching system.

BACKGROUND OF THE INVENTION

Within the prior art, mobile telephone communication systems are of two general types: cellular telecommunication systems and personal communication systems (PCS) also referred to as telepoint systems. A cellular telecommunication system covers a large geographical area offering a user with a mobile telephone a possibility to make calls at the office, in residential areas, and in vehicles while having continuous service. A disadvantage of cellular telecommunication system is the high cost, weight and size of the telephones, the high charges charged by the operators for becoming a user of such a system, and the high charge per minute of call as compared to a fixed telecommunication system. PCS is a compromise between the low cost and lack of freedom of a fixed telecommunication system and the high cost and freedom of a cellular telecommunication system. The PCS concept offers users small light-weight battery-powered portable telephones for making calls anywhere that has a fixed point telepoint radio transceiver. The telepoint transceivers are located at various places such as railroad stations, airports, pedestrian areas, office buildings, and residential areas. The provision of telepoints in residential areas allows the user of a PCS telephone to make calls from their residence and also provides an alternate telecommunication service to that provided by the fixed telecommunication system. In order to make or receive a call, the user of a PCS telephone must find a telepoint transceiver and must remain within the range of that telepoint transceiver throughout the duration of the call. If the user moves outside the range, the call could be cutoff since there may not be call hand offs between telepoint transceivers. The PCS concept requires comparatively little power consumption in the PCS telephones in comparison to the cellular telephones.

Problems do exist in prior an PCS systems. One problem is that of providing authentication information to a telepoint controller when a user of a PCS telephone wishes to make a call or to register their PCS telephone. Because of the much larger number of PCS telephones and telepoint base stations as compared to cellular telephones and cells in a given geographical area, the use of a central computer to keep track of where PCS telephones are and to provide the authentication information for those telephones is both expensive and extremely time consuming. WIPO Patent Application No. WO 94/01976 discloses such a system where the authentication information is maintained in a management system. U.S. Pat. No. 5,040,177 discloses a telepoint system that utilizes a separate switching network and a service control point network. The service control point network handles the distribution of the authentication information.

Whereas, the prior art systems do provide partial solutions to the problem, these systems do not function well under heavy traffic conditions involving a large number of registrations. What is needed in a distributed switching telecommunication system is a rapid method for registering PCS telephones.

SUMMARY OF THE INVENTION

The preceding problem is solved and the technical art is advanced by an apparatus and method that allow multiple copies of authentication information for a PCS telephone to exist in switching nodes of a distributed switching system; where, the PCS telephone is only registered on one switching node at a time. One copy is maintained on the resident switching node, and another copy is maintained on the switching node on which the PCS telephone was last registered other than the resident switching node. If the PCS telephone normal only registers on the resident switching node and one other switching node, the authentication information is present on both switching nodes, and both always have the authentication information to register the PCS telephone stored internally which speeds up the registration process. Further, the authentication information does not have to be repeatly communicated through the distributed switching system.

If the switching nodes are arranged into an authentication hierarchical structure, the authentication information remains stored on a switching node that last used the authentication information within the authentication hierarchical structure, so that all switching nodes in that authentication hierarchical structure can access the authentication information. An authentication hierarchical structure allows any switching node that is part of the authentication hierarchical structure to obtain the authentication information from another switching node within the authentication hierarchical structure if another switching node has the authentication information.

BRIEF DESCRIPTION OF THE DRAWING

FIGS. 5–16 illustrate integral tables utilized by the switching nodes of FIG. 1;

DETAILED DESCRIPTION

Figure 1:
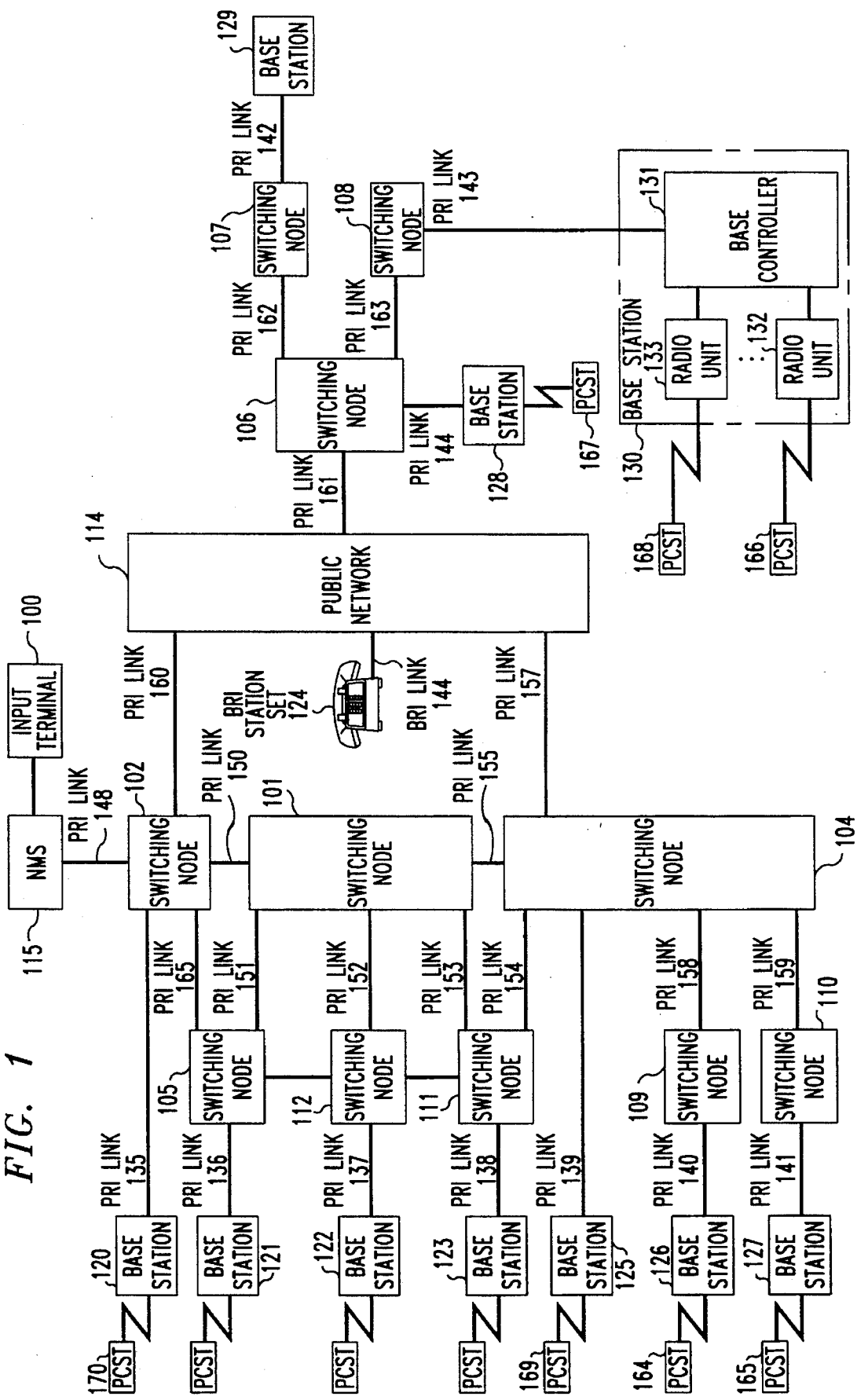
FIG. 1 shows a distributed telecommunication switching system for providing PCS service.

FIG. 1 shows a telecommunication switching system having a plurality of switching nodes 101 through 112 for providing PCS service. The switching nodes are interconnected to public network 114 via PRI links 157, 160, and 161. The switching nodes are interconnected via PRI links to base stations 120–123 and 125–130. Each base station is a telepoint and can service a plurality of PCS telephones (referred on the drawing as PCST) such as PCS telephones 164–170. The PCS telephones can make and receive telephone calls from other PCS telephones and from station sets, such as BRI station set 124, directly connected to public network 114. In addition, analog telephone sets connected to public network 114 can make calls to the PCS telephones. Each PCS telephone is considered to have a resident switching node and base station to which the directory telephone number of the PCS telephone is assigned. Each directory telephone number is assigned to a specified PCS telephone. Normally, this would be the base station serving the user of the PCS telephone's home. In FIG. 1, switching nodes 101, 102, 104, 105, 109, 110, 111, and 112 are located in the work center for a metropolitan area; whereas, switching nodes 106, 107, and 108 are located in residential portions of the metropolitan area. There could be more switching nodes in residential areas. PCS telephone 168 stores the switching node number for switching node 108 which is its resident switching node.

The switching nodes of FIG. 1 are arranged into a directory dialing plan and a switching node hierarchy. Assume that the resident switching node of PCS telephone 168 is switching node 108 and that the user of PCS telephone 168 leaves his/her home and travels to his/her office which for sake of an example is served by switching node 110 and registers on base station 127. As part of the registration procedure, PCS telephone 168 transmits its resident switching node number to switching node 110. Switching node 110 utilizes the resident switching node number to route through the switching node hierarchy to switching node 108 requesting the authentication information for PCS telephone 168. Switching node 108 transmits to switching node 110 the authentication information for PCS telephone 168 and marks in an internal table that PCS telephone 168 is presently registered on switching node 110. Switching node 110 stores the authentication information for PCS telephone 168 until PCS telephone 168 registers on another switching node other than switching node 108, or switching node 110 exceeds the amount space available for storing authentication information and determines that PCS telephone 168 has been used less than any other PCS telephone. Switching node 110 continues to store the authentication information even if PCS telephone 168 subsequentially re-registers on switching node 108. If PCS telephone 168 is registered on switching node 110, when a incoming call is received for PCS telephone 168 by switching node 108, the latter switching node redirects that call to switching node 110.

Unlike a prior art system of switching nodes such as a network of Definity Generic II communication systems, a switching node of FIG. 1 has no predefined stored information defining how this system is configured before initialization, with what telecommunication links are terminated on which nodes, what interfaces are utilized to terminate those links, the physical configuration of the switching nodes, and the type and features of the station sets. Further, there is no predefined information setting forth the directory dialing plans which is utilized to identify the telecommunication terminal equipment connected to each of the switching nodes. Finally, each switching node has no predefined knowledge of what telecommunication terminals are connected to it.

Figure 2:
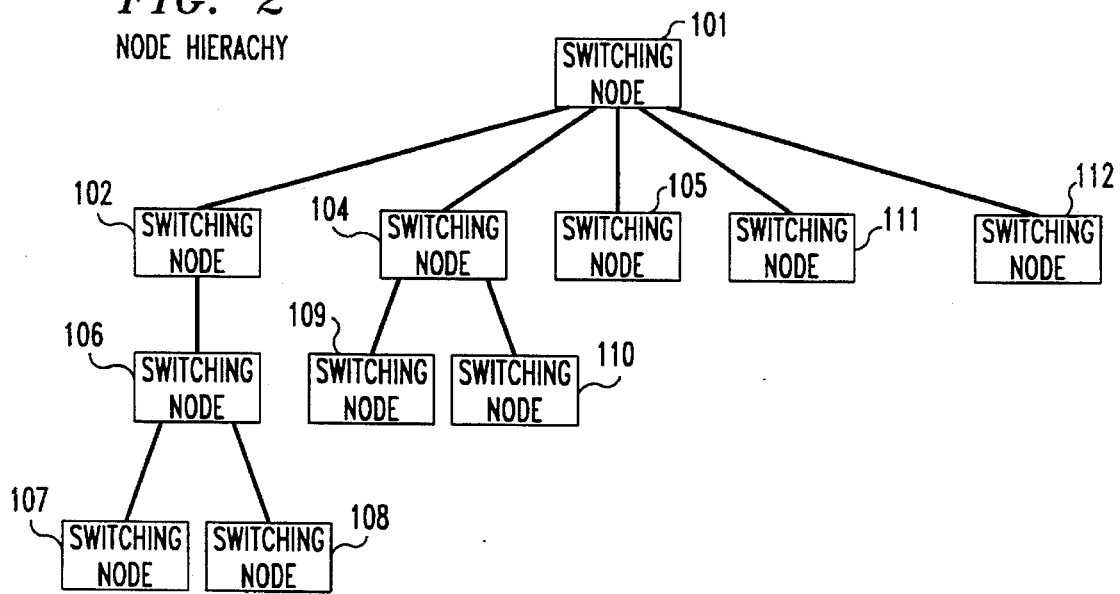
FIG. 2 illustrates the node hierarchy of the switching nodes of FIG. 1.
Figure 3:
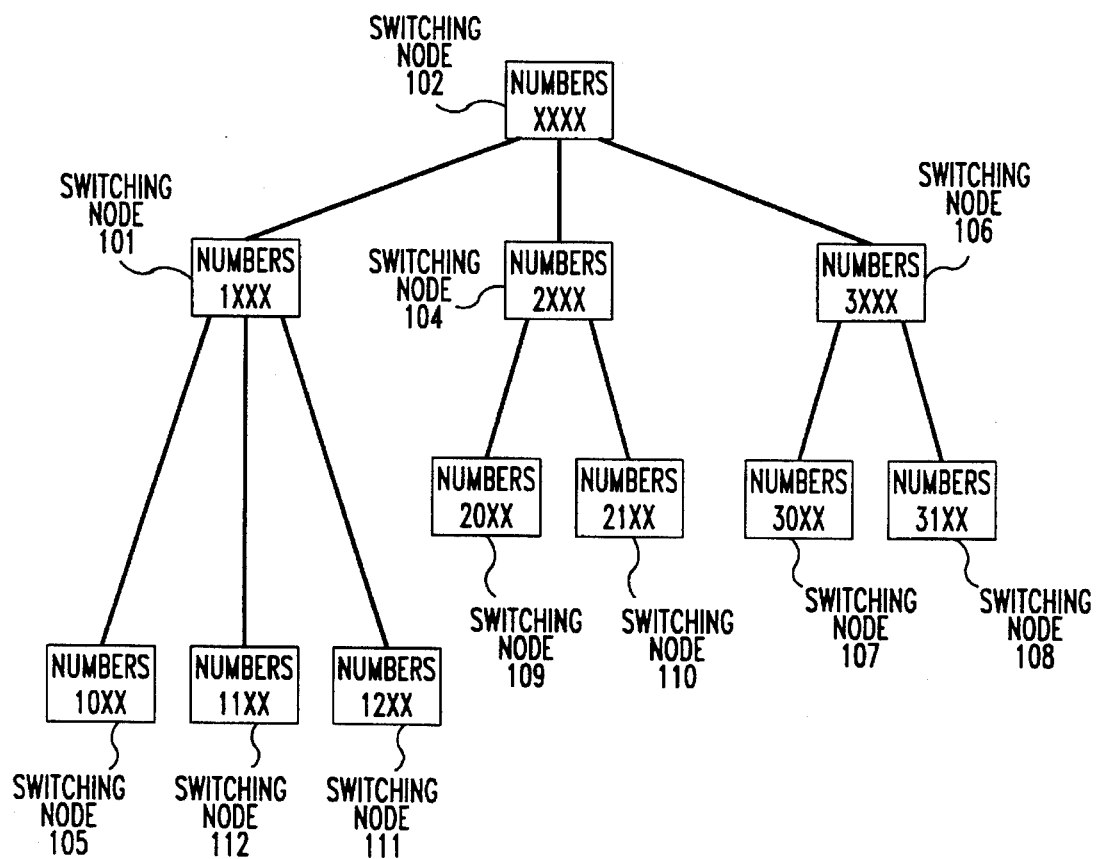
FIG. 3 illustrates the dialing plan hierarchy of the switching nodes of FIG. 1.

Each switching node determines the above information upon the entire system being initialized or an individual switching node being initialized or the initialization of a new telephone communication terminal. In addition, an individual switching node begins to determine new paths through the system upon an individual telecommunication link becoming active after the switching node has been initialized. To obtain this information, each switching node as it becomes active must perform the following functions: (1) establish its own integral configuration, (2) identify and initialize interfaces including base stations, (3) establish its position in the switching node hierarchy, (4) obtain ownership for its portion of the directory dialing plan, and (5) learn how to route calls through the systems. In addition, NMS 115 must establish a call to each switching node in order to distribute the directory dialing plan among the switching nodes and to provide other management functions. Each of these functions is described in the U.S. patent application of B. M. Bales, et al. "Automatic Initialization of a Distributed Telecommunication System", Serial No. 07/816360, filed on Dec. 30, 1991, assigned to the same assignee as the present application, and hereby incorporated by reference. FIG. 2 illustrates the switching node hierarchy and FIG. 3 illustrates the directory dialing plan hierarchy.

Consider now when a PCS telephone first registers on its resident switching node. For example, when PCS telephone 168 initially registers on switching node 108, a mobility management application in switching node 108 requests the service profile I.D. (SPID) information from PCS telephone 168. The SPID information identifies the terminal service profile (TSP) which includes the resident switching node number. Because of this, the mobility management application is also requesting the switching node number. The SPID information also defines the directory telephone number and the resident switching node number. The mobility management application determines from the resident switching node number that PCS telephone 168 is assigned to switching node 108. Mobility management application interrogates internal tables for the terminal service profile of PCS telephone 168. Finding no terminal service profile, the mobility management application then transmits a message to network management system (NMS) 115 requesting the TSP. Once the TSP is received from network management system 115, switching node 108 proceeds with the registration procedure. As is described later in greater detail, switching node 108 does not own the directory telephone number and must request permission from switching node 102 to host the number. If the resident switching node number did not designate switching node 108, the mobility management application utilizes the resident switching node number to transmit a message to the resident switching node requesting the authentication information for PCS telephone 168. This message also includes the node number of switching node 108 and the directory telephone number for PCS telephone 168.

For example, when PCS telephone 168 registers on switching node 110 and switching node 110 is operating in a stand alone mode, a message is sent by switching node 110 to switching node 108 requesting the authentication information and including the node number for switching node 110 and the directory telephone number. This message is transferred to the mobility management application of switching node 108. The mobility management application interrogates its internal table to determine if it has the TSP for PCS telephone 168. If the TSP is not present, the mobility management application obtains it from network management system 115. Regardless, the mobility management application transmits to switching node 110 a message containing the authentication information for PCS telephone 168. The mobility management application records in the integral table that PCS telephone 168 is registered on switching node 110. Upon receiving the message from switching node 108, the mobility management application of switching node 110 stores the authentication information in an internal table along with the fact that switching node 108 is the resident switching node. Switching node 110 continues to store the authentication information for PCS telephone 168 until PCS telephone 168 registers on another switching node other than switching node 108, or switching node 110 exceeds the amount space available for storing authentication information and determines that PCS telephone 168 has been used less than any other PCS telephone. Switching node 110 continues to store the authentication information even if PCS telephone 168 subsequentially re-registers on switching node 108.

When an incoming call is received for PCS telephone 168 by switching node 108, that call is eventually transferred to the mobility management application. The mobility management application determines on which switching node PCS telephone 168 is registered. If the telephone is registered on switching node 108 via base station 130, the call is transferred to base station 130. However, if PCS telephone 168 is registered on switching node 110, the mobility management application requests that the incoming call be redirected to switching node 110.

Figure 4:
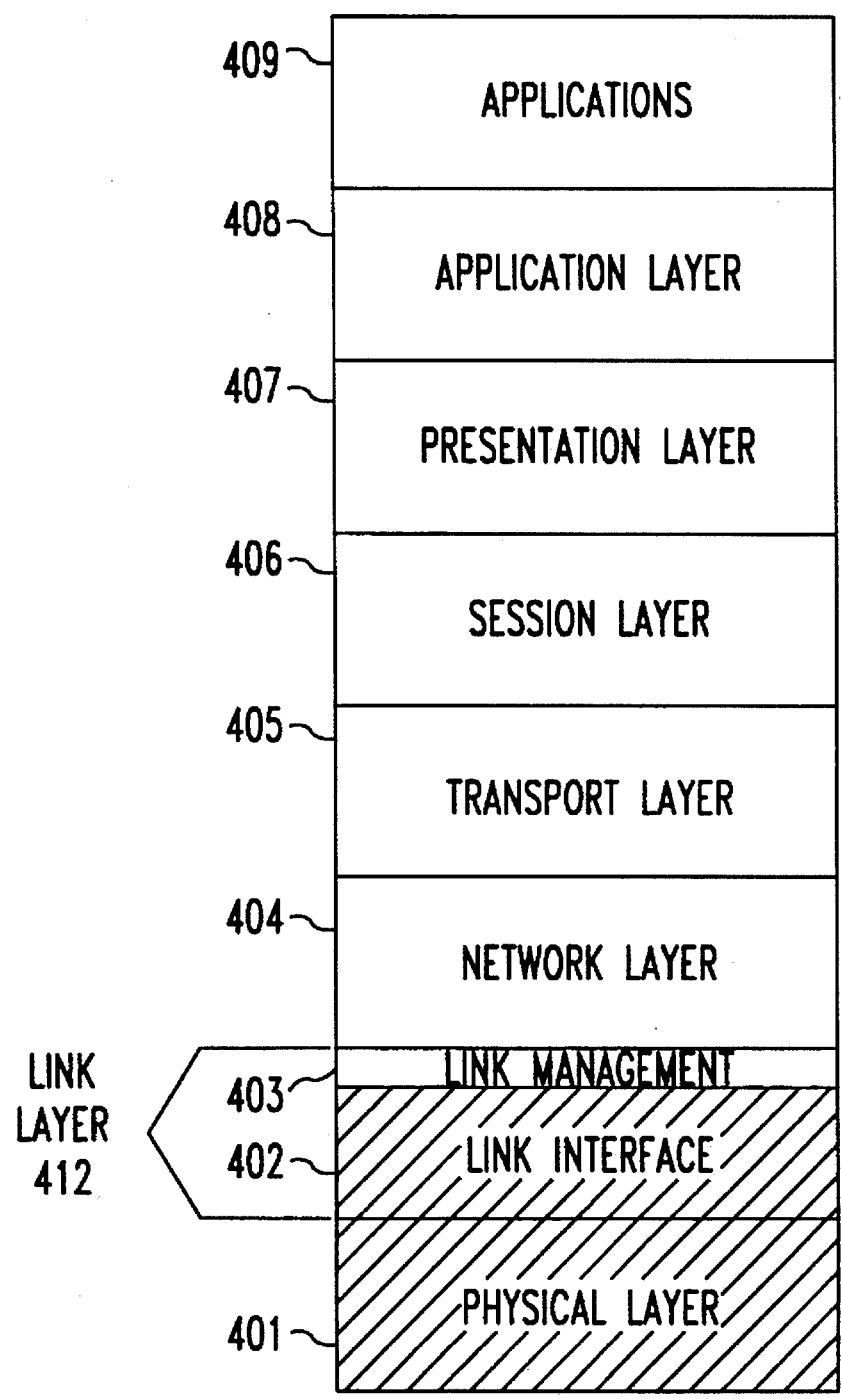
FIG. 4 illustrates a software architecture in accordance with the invention.

FIG. 4 illustrates the software architecture of the switching nodes of FIG. 1. This architecture is based on the conventional OSI model modified to implement the ISDN protocol. In accordance with the invention as described herein, certain further modifications have been made to the standard model in order to include ISDN capabilities.

The principal function of physical layer 401 is to terminate physical links. Specifically, physical layer 401 is responsible for maintaining physical channels and for controlling physical subchannels thereon. Physical layer 401 comprises a software portion and physical interfaces. Further, the software portion of physical layer 401 is responsible for the direct control of the physical interfaces to which physical links communicating PRI and BRI information terminate. Physical layer 401 presents to link layer 412 physical subchannels and physical channels as entities controllable by link layer 412.

The primary function of link layer 412 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 412 and physical layer 401. (An example of this type of protocol is the LAPD packet protocol used in ISDN Q.921. In the ISDN standard, link layer 412 terminates the LAPD protocol.) Link layer 412 can support multiple protocols so that the upper layers are uneffected by the different protocols being utilized. Further, link layer 412 allows higher software layers to control physical layer 401 in an abstract manner.

As seen in FIG. 4, link layer 412 is divided into link interface 402 and link management 403. The reason for this division is set forth herein below. It will be helpful at this point to discuss the communication of ISDN signals over a D channel to help readers, for example, who have only a rudimentary knowledge of the communication of ISDN signals over a D channel. At link layer 412, a plurality of logical links is established on a D channel. Only one of these logical links communicates ISDN control signals, and this logical link is referred to herein as a logical D channel (LDC). The LDC is identified by a logical D channel number (LDCN).

Link interface 402 does the majority of the functions performed by link layer 412, including the establishment of the logical links. Link management 403 identifies the various link interfaces for higher software layers. Further, link management communicates information between the logical links and higher software layers.

Network layer 404 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 102 via PRI link 150, network layer 404 of switching node 101 negotiates with its peer layer (the corresponding network layer 404 in switching node 102) in order to obtain allocation of a B channel in PRI link 150—a procedure later to be repeated if a second B channel is desired. This negotiation is carded out using standard ISDN Q.931 messages such as the call setup and connection messages via the LDC setup on the D channel of PRI link 150. Network layer 404 identifies all B channels of given interface with the LDC for that interface. Network layer 404 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 404 receives information from another node concerning a call via a LDC. As information is received on the LDC, a call reference number is utilized to identify the call associated with this message. The call reference number is selected by the originating network layer during call setup in accordance with the ISDN standard. Details of this identification are given with respect to FIG. 14.

Transport layer 405, is the key element that allows the routing of a call through a complex system having multiple nodes as illustrated in FIG. 1. Its primary function is to manage the routing of calls externally, i.e., between switching nodes. Transport layer 405 views the system of FIG. 1 in terms of nodes and is concerned with routing calls from its own node to other nodes or endpoints. (As explained in the detailed discussion of session layer 406, that layer, not transport layer 405, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 405 is the first layer that starts to take a global view of the overall system illustrated in FIG. 1. Transport layer 405 uses information provided by session layer 406 to select the inter-node path. The transport layer performs its task of routing between various nodes by the utilization of tables defining the available paths and the options on those paths. These tables do not define all paths but only those paths which the node has already used.

Communication between transport layers is done by network layer 404 using established LDCs. Transport layer 405 communicates information destined for its peers to network layer 404, and network layer 404 packages this information within the information elements, IEs, of standard ISDN Q.931 messages. Network layer 404 uses the LDC that has been setup to a particular node to communicate this information to its peer network layer. Similarly, when another network layer receives information of this type, the other network layer unpackages information and then directs the information to the transport layer.

The primary function of session layer 406 is to establish communication among endpoints with all endpoints considered to be applications including, for example, a BRI station set is considered an application. Significantly, these endpoints may be applications such as the application performing the call processing features or the dialing plan application. In any event, connections between such endpoints is considered a call. A session (call) is set up by session layer 406 any time two applications require communication with each other. As noted earlier, session layer 406 deals only in terms of switching nodes and applications on those switching nodes and relies on transport layer 405 to establish paths to other switching nodes. Session layer 406 identifies the called application by an address which previously in the telecommunication art was thought of as only a telephone number but has a much broader concept in the Q.931 protocol. From this address, session layer 406 determines the destination switching node. Session layer 406 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 407 of FIG. 4 invokes a complex protocol in order to groom the information being communicated between applications so that the applications are totally divorced from the protocol used to communicate the information. A presentation level protocol allows an application to communicate with a peer application across a transport path.

Finally, application layer 408 manages the resources needed by the applications running at software layer 409. When an application at software layer 409 is communicating with another peer application, the application is unaware of how many other applications exist or where these other applications are located. It is the function of application layer 408 to determine and use such details, consequently allowing the applications to be written in a very abstract manner.

Consider now in greater detail how a non-resident node obtains authentication information using the resident switching node number and how calls are directed from a resident node to a non-resident node. The manner in which these operations are performed depends on whether the non-resident node is in an authentication hierarchical structure of switching nodes with respect to the storage of authentication information or the non-resident node is in a stand alone mode.

As is described in the U.S. patent application of Bales, et al., the switching nodes of FIG. 1 rapidly learn how to route calls through the system of switching nodes both on the basis of the directory telephone numbers and on the node numbers of the switching nodes. Tables 502–504, 507–509, 602–604, 607–609, 702–704, 707–709, and 802–804 of FIGS. 5–8 illustrate the dialing plan, level 5 routing, and level 4 routing tables for switching nodes 108, 102, 101,104, 109, 110, and 106, respectively. Note, the entries shown for telephone number 4401 are not yet present in the tables at this point in the description. The tables illustrated in FIGS. 5–8 only illustrate the material relative to the present example, one skilled in the art would readily see that these tables would include more information concerning other PCS telephones and switching nodes. Not shown are also the tables that define within a given switching node to which base station a PCS telephone is registered.

Consider now the stand alone case where the switching nodes of FIG. 1 are not arranged in any authentication hierarchical structure and continue to utilize the previous example dealing with PCS telephone 168. Before PCS telephone 168 registers on switching node 108, PCS telephones 164–166, 169, and 170 have registered on their resident switching nodes as illustrated in FIG. 1. All of these PCS telephones are assigned telephone numbers which are part of the dialing plan owned by their respective switching nodes. The telephone numbers for these nodes are the first entry into the mobility tables of FIGS. 5–8. For example, telephone number "3130" of mobility table 501 for node 108 is PCS telephone 166. The purpose of the various entries in the dialing plan, level 5 routing, and level 4 routing tables is explained in detail in the previously referenced U.S. patent application of Bales, et al.

Consider now the meanings of entries for the mobility tables. The state entry indicates whether the telephone number is resident (1) or non-resident (0) on the switching node. A state of "2" indirects that switching node is in an authentication hierarchical structure for the telephone number but is neither the resident nor non-resident switching node. The node number entry designates the resident node of the telephone number. The node pointer is utilized in a authentication hierarchy structure to point to the next lower node in the structure having the authentication information. The authentication pointer is used to point to a memory location within the switching node of the authentication information. If the authentication pointer is 0, this indicates that the authentication information is not present on this node. The time field indicates the time that the authentication information was received. The activity field contains the time that the PSC telephone made or received a call via the switching node.

Assume now that PCS telephone 168 registers on switching node 108 via base station 130 for the first time. The mobility management application of switching node 108 is responsive to the registration to obtain the directory telephone number, 4401, and the node number of the resident switching node, 108. The mobility management application interrogates mobility table 501 and does not find an entry for telephone number 4401, since entry 512 has not yet been made. The mobility management application then transmits a message to NMS 115 requesting the authentication information and the rest of the TSP. The transfer layer of switching node 108 readily routes this message to NMS 115 by examining table 504 and determining that the link to be utilized is 163. When the message is received by switching node 102, switching node 102 examines table 509 of FIG. 5 and immediately routes the message to NMS 115 via link 148. NMS 115 then transmits the TSP which includes the authentication information back to switching node 108.

Before switching node 108 can utilize directory telephone number 4401, it must request permission to host this number, since it does not own that portion of the dialing plan that includes 4401 as can be observed from FIG. 3. As is described in great detail in the previous referenced U.S. patent application of Bales, et al., switching node 108 receives permission to utilize that number from switching node 102 which owns the portion of the dialing plan that includes telephone number 4401. Obtaining permission to host the number is performed by the dialing plan application of switching node 108 at the request of the mobility management application. After permission has been received to host the number, mobility management application then inserts entry 512 into table 501. The state is "1", since node 108 is the resident node for telephone number 4401. The dialing plan application for switching node 108 also inserted entry 514 into table 503. The node pointer of table 501 is set to "0" since there is no authentication hierarchical structure of nodes. The authentication pointer of table 501 now points to the location in memory where the actual authentication information is stored, and the time field information is inserted. After these operations are accomplished, mobility management application would complete the registration of PCS telephone 168.

Assume now that the user of PCS telephone 168 leaves his/her home that is served by switching node 108 and goes to his/her office that is served by switching node 110. When PCS telephone 168 registers on switching node 110 via base station 127, the mobility management application of switching node 110 obtains the resident switching node number and directory telephone number from PCS telephone 168. First, the mobility management application interrogates mobility table 706 of FIG. 7 to see if there is an entry for telephone number 4401. Since PCS telephone 168 has just initially registered with switching node 108, there is not; and the mobility management application must transmit a message to the mobility management application of switching node 108. This message is routed utilizing the node number of switching node 108 (resident switching node number). The message includes the switching node number of switching node 110 and the directory telephone number, 4401. The transport level of switching node 110 is responsive to the request for transmitting the message to interrogate table 709 of FIG. 7 and determines that the message to be routed to switching node 108 on link 159. Similarly, the transport layers of switching node 104, 101, 102 and 106 perform similar interrogations of their level 4 routing tables using the node number of switching node 108 to determine the link that is to be utilized to send the message to switching node 108. These entries in the various level 4 routing tables were set up in response to telephone calls made to or from switching node 108 using the block of directory numbers, "31xx" that are the portion of the dialing plan owned by switching node 108. To route the call on the basis of the directory telephone number, 4401, would be a more difficult and time consuming task since switching node 110, 104, and 101 have no information stored in their level 5 routing table indicating that switching node 108 is hosting the directory telephone number, 4401.

When the mobility management application of switching node 108 receives the message from switching node 110, it utilizes the directory telephone number to access entry 512, utilizes the authentication pointer to access the authentication information, and transmits the authentication information in a message back to the mobility management application of switching node 110. The mobility management application of switching node 108 then updates mobility table 501 as illustrated in entry 512 of FIG. 9. In entry 512, the state has been changed to "0" indicating that the PCS telephone is no longer registered on switching node 108, and the node number has been changed to 110 indicating that the PCS telephone is registered on switching node 110. In response to the message received back from switching node 108, the mobility management application of switching node 110 inserts entry 901 into mobility table 706 of FIG. 9. Entry 901 indicates that telephone number 4401 is presently registered on switching node 110, state equals "1" and the node number 108 indicates that the resident node is switching node 108.

Consider now when BRI station set 124 dials directory telephone number 4401, when PCS telephone 168 is registered on switching node 110. The call is routed to switching node 108 where the session layer interrogates level 5 routing table 503 of FIG.5. The session level determines from entry 514 that the call is to be routed to the mobility management application. The mobility management application is responsive to the call to access entry 512 of table 501 of FIG. 9 and determines that PCS telephone 168 is currently registered on switching node 110. The mobility management application then requests that the call be redirected to switching node 110. The transport layer of switching node 108 is responsive to this request to access the level 4 routing table 504 of FIG. 5 and to redirect the call to switching node 110 using link 163. Entry 515 was added to table 504, when switching node 110 requested the authentication information. When the call is received at switching node 110, the session layer is responsive to the directory telephone number to access entry 901 of table 706 of FIG. 9 and to direct the call to the memory management application. The memory management application determines on the basis of the state field being "1" that PCS telephone 168 is presently registered on switching node 110. The mobility management application then utilizes the lower levels to interconnect the call to PCS telephone 168 via base station 127.

Entries 512 and 901 of FIG. 9 are stable until PCS telephone 168 is no longer registered on switching node 110 or switching node 110 can no longer store the authentication information. Switching node 110 can store the authentication information even if PCS telephone 168 is not registered on switching node 110, but PCS telephone 168 can only be registered on switching node 108 for this to be the case. If switching node 110 is storing the authentication information but PCS telephone 168 is not registered on switching node 110, then the state field of entry 512 is set equal to a "1" to indicate that telephone number 4401 is registered on switching node 108, and the state field of entry 901 is set equal to a "0" to indicate that telephone number 4401 is not registered on switching node 110. As previously mentioned, each switching node has a finite amount of memory space in which to store authentication information. Once this space has been exceeded, the switching node must stop storing the authentication information for one telephone number to create sufficient memory space to handle a newly registering PCS telephone. If the PCS telephone whose telephone number is selected for termination of authentication information storage is still registered, then the registration must be terminated as well as the authentication information storage being terminated. The selection of the telephone number is performed by determining the telephone number which last the largest difference between the content of the telephone number's activity field and the present time.

If switching node 110 determines that PCS telephone 168 should no longer be registered, the mobility management application transmits a message to that effect to the mobility management application of switching node 108. That mobility management application removes the designation in entry 512 to switching node 110. The mobility management application on switching node 110 removes entry 901. If the mobility management application of switching node 108 determines that PCS telephone 168 should no longer be registered on switching node 110, that mobility management application sends a message to the mobility management application of switching node 110 which results in the removal of entry 901. One condition under which switching node 108 would determine that the registration should be eliminated on switching node 110 is if PCS telephone 168 registered on another switching node.

If switching node 110 selects the authentication information of telephone number 4401 for termination and PCS telephone 168 is not registered on switching node 110, the mobility management application of switching node 110 transmits a message to that effect to the mobility management application of switching node 108. That mobility management application removes the designation in entry 512 to switching node 110. The mobility management application on switching node 110 removes entry 901.

Consider now the case where switching node 110 is part of an authentication hierarchical of nodes. These authentication hierarchies are assumed to have the same hierarchical structure as illustrated in FIG. 2 for simplicity. However, a different hierarchy could be used. The hierarchical state word containing a "1" which is maintained by the mobility managementment application defines when the top of the authentication hierarchical structure has been reached. For sake of an example, it is assumed that the authentication hierarchical structure for switching node 110 includes switching nodes 104 and 101. The mobility tables of FIG. 10 define this structure. The top of this authentication hierarchical structure is denoted by hierarchical state word 605 of FIG. 10 for switching node 101 containing a "1". If switching node 104 was to be the highest node in the authentication hierarchical structure, hierarchical state word 610 of FIG. 10 would contain a "1" rather than a "0". Hierarchical state words 705 and 710 of FIG. 10 are also "0" indicating that switching nodes 109 and 110 are pan of the authentication hierarchy structure. In the present example, the telephone numbers illustrated in FIG. 10 have already registered. Mobility table 601 for switching node 101 reflects that the three telephone numbers are not present on switching node 101 by the state entry being a "2". The node number entry indicates the node that is the resident node for the telephone numbers, and the node pointer entry indicates that the structure descends down to switching :node 104. Finally, the fact that there is an entry for each of the telephone numbers in the authentication pointer entry indicates that switching node 101 has the authentication information for the directory telephone numbers.

Consider now the example where PCS telephone 168 registers on switching node 110. The mobility management application of switching node 110 first checks to see if it has in mobility table 706 of FIG. 10 an entry for telephone number 4401. Since it does not, the mobility management application for switching node 110 transmits a message to the mobility management application of the next highest node in the authentication hierarchical structure which is switching node 104. Included in this message is the telephone number, 4401, of PCS telephone 168, the switching node number of node 110, and the resident switching node number which is switching node 108. The mobility management application of switching node 104 is responsive to the message to determine if it has a reference to directory telephone number 4401 by examining mobility table 606 of FIG. 10. Since the mobility management application of switching node 104 does not in the present example, it transfers the message to the mobility management application of switching node 101. That mobility management application does not have a reference to directory telephone number 4401 in mobility table 601 of FIG. 10. However, by examining hierarchical state word 605 of FIG. 10, the mobility management application of switching node 101 determines that it is at the top of the authentication hierarchical structure and utilizes the resident switching node in the message from switching node 104 to transmit a message to the mobility management application of switching node 108.

The mobility management application of switching node 108 is responsive to the message to make an entry that is identical to entry 512 into mobility table 501 of FIG. 5 for switching node 108. The mobility management application of switching node 108 then routes the authentication information directly back to switching node 110. This routing may take a different path than that indicated by the node hierarchy of FIG. 2.

When the mobility management application of switching node 110 receives the authentication information, it stores entry 1101 in mobility table 706 of FIG. 11 and transmits the authentication information to the mobility management application of switching node 104. The latter mobility management application stores entry 1102 in mobility table 606 of FIG. 11. Note, that the node number points to switching node 108 which is the resident node. In addition, the mobility management application of switching node 104 transmits the authentication information and node numbers of nodes 110 and 108 to the mobility management application of switching node 101 which stores this information in entry 1103 of mobility table 601 of FIG. 11.

As will have to be brought out at a later time, the authentication information is pointed to by the authentication pointer field of the various records. Depending on the activity, the switching nodes in the authentication hierarchical structures may not retain the actual authentication information if it has not been used for a long period of time or if other telephones are registering requiring the memory space. In that case, the authentication pointer field will be "0". If the authentication pointer is "0", then the mobility management application must either go up or down the hierarchical authentication structure until it finds a switching node which has retained the authentication information. In general, the switching node on which the PCS telephone is actually registered retains the authentication information.

If switching node 110 decides to unregister PCS telephone 168, stop storing the authentication information for telephone number 4401, or receives a message from switching node 108 to do so, the mobility management application of switching node 110 removes entry 1101 and transmits a message to the mobility management application of switching node 104 informing it that it should remove entry 1102. Similarly, the mobility management application of switching node 104 sends a message to switching node 101 informing that mobility management application that it should remove entry 1103.

Consider the situation where the mobility tables are as illustrated FIG. 11 and PCS telephone 168 registers on switching node 109. The resulting changes to the mobility tables are illustrated in FIG. 12. The mobility management application of switching node 109 requests the authentication information for directory telephone number 4401 from the mobility management application of switching node 104. The latter mobility management application examines mobility table 1102 of FIG. 11 and determines that an entry for the directory telephone number exists. The mobility management application of switching node 104 transmits this authentication information to switching node 109 and sends a message to the mobility management application of node 110 informing it that PCS telephone 168 is no longer registered with switching node 110. The mobility management application of switching node 110 removes entry.

When the mobility management application of switching node 109 receives the authentication information, it creates entry 1201 in table 701 of FIG. 12. The mobility management application of switching node 104 also removes entry 1102 of FIG. 11 and replaces it with entry 1202 of FIG. 12. Finally, the mobility management application of switching node 109 transmits a message back to the mobility management application of switching node 108 informing it that switching node 109 now has PCS telephone 168 registered. The mobility management application of switching node 108 updates entry 512 of mobility table 501 of FIG. 5 to reflect this fact.

Note, that if PCS telephone 168 had registered on switching node 105 instead of switching node 109, the mobility management application of switching node 101 would have sent a message to switching node 104 informing it to remove entry 1102 of FIG. 11. In turn, the mobility management application of switching node 104 would have sent a message to switching node 110 to remove entry 1101 of FIG. 11.

The switching nodes of FIG. 1 have a finite amount of memory space in which to store authorization information. To conserve memory space, it is only necessary for one switching node in the authentication hierarchical structure to store the authentication information. The following sets forth two embodiments for allowing only one switching node to store the authentication information. The first embodiment assumes that the switching node on which the PCS telephone is registered stores the authentication information longer then any other switching node in the authentication hierarchical structure. The second embodiment assumes that a switching node relatively high in the authentication hierarchical structure has a large amount of memory space allocated for storing authentication information and that this node stores the authentication information longer than the other switching nodes in the authentication hierarchical structure. In both embodiments, when the mobility management application of a switching node determines that it can no longer store the authentication information, that application must interrogate the mobility memory management applications of the switching nodes above and below it in the authentical hierarchical structure to determine if any other mobility management application is still storing the authentication information. If no other mobility management applications are still storing the authentication information, then the mobility management application of the node preparing to delete the authentication information must (1) transmit messages to the mobility management applications in the switching nodes above and below it informing these applications that they are to delete their entry for the particular telephone number associated with this authentication information and (2) delete its own entry for that particular telephone number. In addition, the mobility management application of switching node on which the corresponding PCS telephone is registered must inform the mobility management application of the resident switching node that the telephone is no longer registered.

Consider now the first embodiment with respect to the previous example. FIG. 13 illustrates the mobility tables for switching nodes 101, 104, 109, and 110 where only the switching nodes upon which a PCS telephone is registered have retained the authentication information. Consequently, only mobility tables 606, 701, and 706 for switching nodes 104, 109, and 110, respectively, have pointers that point to the authentication information for the telephones actually registered on these switching nodes. A "0" in the authentication pointer field of the mobility table indicates that the authentication information is not being stored on that particular switching node.

Continuing the previous example where PCS telephone 168 leaves switching node 110 and registers onto switching node 109 in light of the information illustrated in the tables of FIG. 13. When PCS telephone 168 registers on switching node 109, the mobility management application receives the directory telephone and the resident switching node number. The mobility management application examines mobility table 701 of FIG. 13 and determines that it has no reference to the directory telephone number 4401. The mobility management application then transmits a message up the authentication hierarchical structure to switching node 104 requesting the authentication information for directory telephone number 4401. The mobility management application of switching node 104 examines entry 1302 and determines that it does not have the authentication information but that switching node 110 is lower in the authentication hierarchical structure. This determination is made on the basis of the node pointer field of entry 1302. The mobility management application of switching node 104 then sends a message down the authentication hierarchical structure to switching node 110. This message requests the authentication information and also informs switching nodes in this downward direction of the authentication hierarchical structure that they are to remove their entries with respect to telephone number 4401 in their mobility tables, after having transmitted the authentication information to the mobility management application of switching node 104.

The mobility management application of switching node 110 is responsive to the message to remove entry 1301 and to transmit the authentication information pointed to by the authentication pointer field of entry 1301 to switching node 104. The mobility management application of switching node 104 is responsive to the authentication information to store this authentication information and insert a pointer into entry 1402 referencing where the authentication information is stored. The mobility management application of switching node 104 then transmits the authentication information to the mobility management application of switching node 109. The latter mobility management application then inserts entry 1401 into table 701 of FIG. 14. FIG. 14 illustrates the resulting mobility tables for switching nodes 101, 104, 109 and 110.

Consider now the second embodiment where the switching nodes do not store all of the authentication information. FIG. 15 illustrates with respect to directory telephone number 4401 a situation where the highest switching node of the authentication hierarchical structure, switching node 101, has maintained a copy of the authentication pointer as indicated by the fact that entry 1503 of FIG. 15 has a pointer in the authentication pointer field. The other switching nodes, switching nodes 104 and 110 have not maintained copies of the authentication information and only have a "0" entry in their authentication pointer field of the mobility tables. PCS telephone 168 is considered to be registered on switching node 110 but is not engaged in an active telephone call.

If PCS telephone 168 places a call while registered on switching node 110 with mobility table 706 containing the information illustrated in FIG. 15, the mobility management application of switching node 110 has to request the authentication information from switching node 104. Since the authentication information is not present on switching node 104, the mobility management application of switching node 104 requests the authentication information from switching node 110 which has the authentication information. The authentication information is then transmitted from switching node 101 to switching node 104 and then to switching node 110. The mobility management application in switching nodes 104 and 110 then change entries 1502 and 1501 of FIG. 15 so that they are identical to entries 1302 and 1301 of FIG. 13. Once switching node 110 has the authentication information, PCS telephone 168 can complete its telephone call.

With respect to the second embodiment, consider the situation where PCS telephone 168 now registers on switching node 109 when the mobility tables have the contents as illustrated in FIG. 15. The mobility management application of switching node 109 examines mobility table 701 of FIG. 15 and determines that it does not have an entry for telephone number 4401 and requests the authentication information from switching node 104. The mobility management application of switching node 104 transmits a message to the mobility management application of switching node 110 requesting the authentication information and informing that mobility management application to remove entry 1501 of FIG. 15. The memory management application of switching node 110 responds with a message stating that it does not have the authentication information. In response to that message, the mobility management application of switching node 104 requests the authentication information from the mobility management application of switching node 101. The latter mobility management application transmits the authentication information to the mobility management application of switching node 104 which in turn communicates the authentication information to switching node 109. After these operations have been completed, the state of the mobility tables is that illustrated in FIG. 16.

Figure 17:
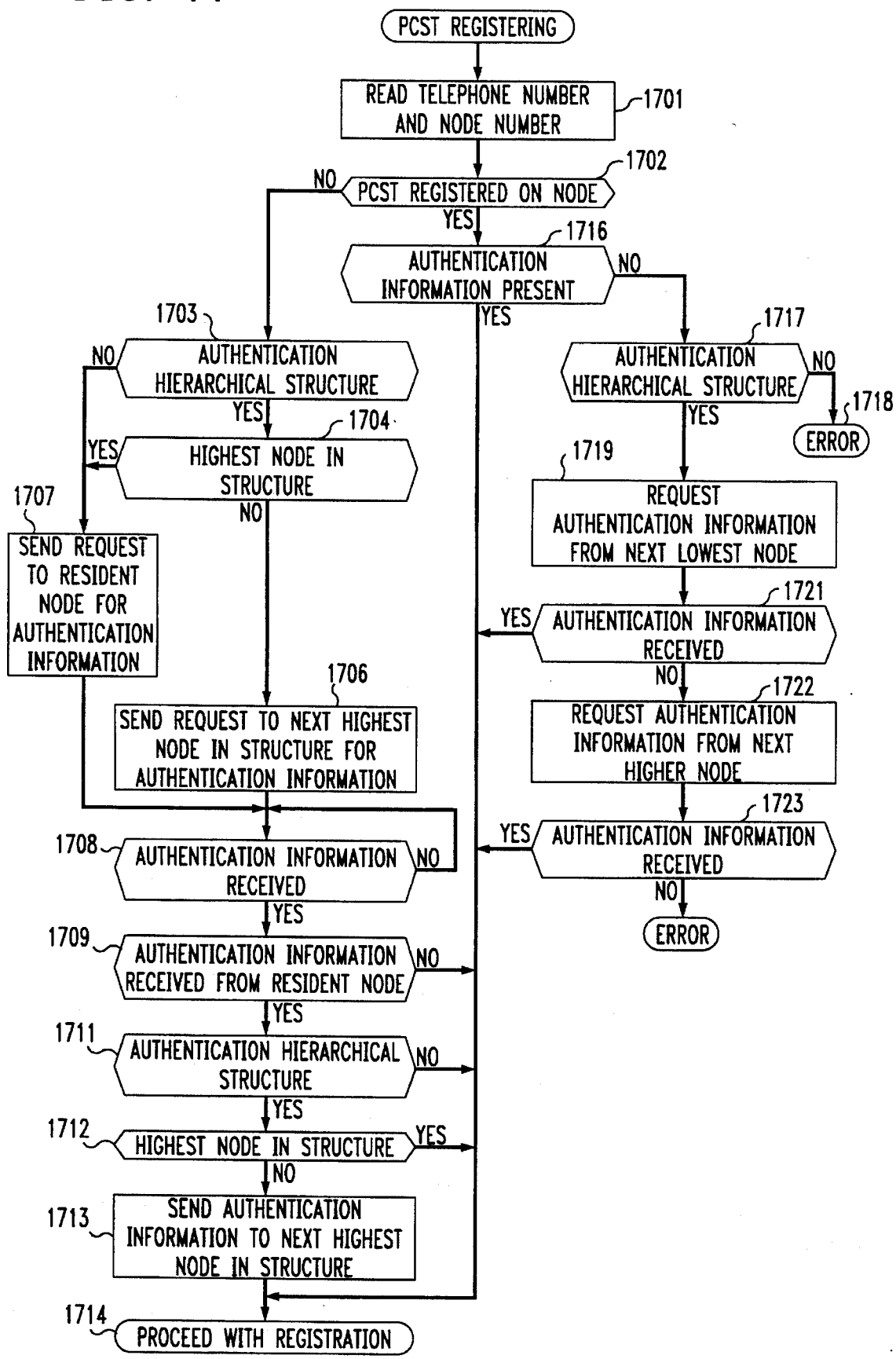
FIG. 17 illustrates, in flow chart form, operations performed by a mobility management application in registering a PCS telephone.

FIG. 17, in flow chart form, illustrates the operations performed by a switching node upon receiving a registration request from a PCS telephone. Block 1701 is responsive to the request to read the telephone number and node number from the PCS telephone. Control is then transferred to decision block 1702 which examines the mobility table of the node to determine if there is a telephone number entry for the telephone of the PCS telephone. Remember that the switching node will maintain a copy of the authentication information for a period of time even if the PCS telephone is not in contact with the switching node via the base station. Hence, it is possible that a user of a PCS telephone has gone home, has used their telephone at home, and then returned to their office. The switching node serving the office still has maintained a copy of the authentication information or there is a copy stored within the authentication hierarchical structure of which the switching node is a part. If decision block 1702 determines that the PCS telephone is not registered on the node, control is transferred to decision block 1703.

Decision block 1703 determines if the switching node is part of an authentication hierarchical structure. If the answer is yes, decision block 1704 determines whether the switching node is the highest node in that authentication hierarchical structure. If the answer to decision block 1704 is no, a request is sent to the next highest node in the structure for the authentication information and control is transferred to decision block 1708.

Returning to decision block 1704, if the answer is yes, control is transferred to block 1707 which sends a request to the resident node utilizing the resident's switching node number to route the request for the authentication information. Then, control is transferred to decision block 1708. Decision block 1708 is re-executed until the authentication information is received. When the authentication information is received, control is transferred to decision block 1709. If the authentication information was received from the resident node, then it is necessary to fill out the mobility tables in the authentication hierarchical structure if one exists. If the information was received from the resident node, control is transferred to decision block 1711 which determines if the requesting node is part of an authentication hierarchical structure. If the answer is yes, control is transferred to decision block 1712 which determines if the requesting node is the highest node in the authentication hierarchical structure. If the requesting node is not the highest node, then it is necessary to send the authentication information up to the higher nodes in the the authentication hierarchical structure so that those nodes can fill out their mobility tables. This action is performed by block 1713. Finally, control is transferred to block 1714 which proceeds with the registration in a normal manner. Note, that control can also be transferred to block 1714 from decision blocks 1709, 1711, and 1712.

Returning to decision block 1702. If the PCS telephone is registered on the node which is indicated by an entry for the telephone number being present in the mobility table, then control is transferred to decision block 1716. If the authentication information is present on the node, decision block 1716 transfers control to block 1714. However, if the authentication information is not present which is indicated by the authentication pointer of the mobility table for the particular telephone number being "0", control is transferred to decision block 1717. The latter decision block verifies that indeed the node is part of an authentication hierarchical structure. If the answer is no, this is an error and control is transferred to block 1718 for error processing. If the answer is yes to decision block 1717, control is transferred to block 1719 which requests the authentication information from the next lowest node in the authentication hierarchical structure. Decision block 1721 waits for the results of the request for the authentication information from the next lowest switching node. If the authentication information is received, control is transfer to block 1714. However, if the authentication information is not received, then control is transferred to block 1721 which request the authentication information from the next higher switching node in the authentication hierarchical structure. Block 1722 transfer control to decision block 1723 which waits for the authentication information to be received. If the authentication information is received, control is transfer to block 1714. However, if the authentication information is not received, control is transferred to block 1724 for error processing, since the authentication information should have been somewhere within the authentication hierarchical structure.

Figure 18:
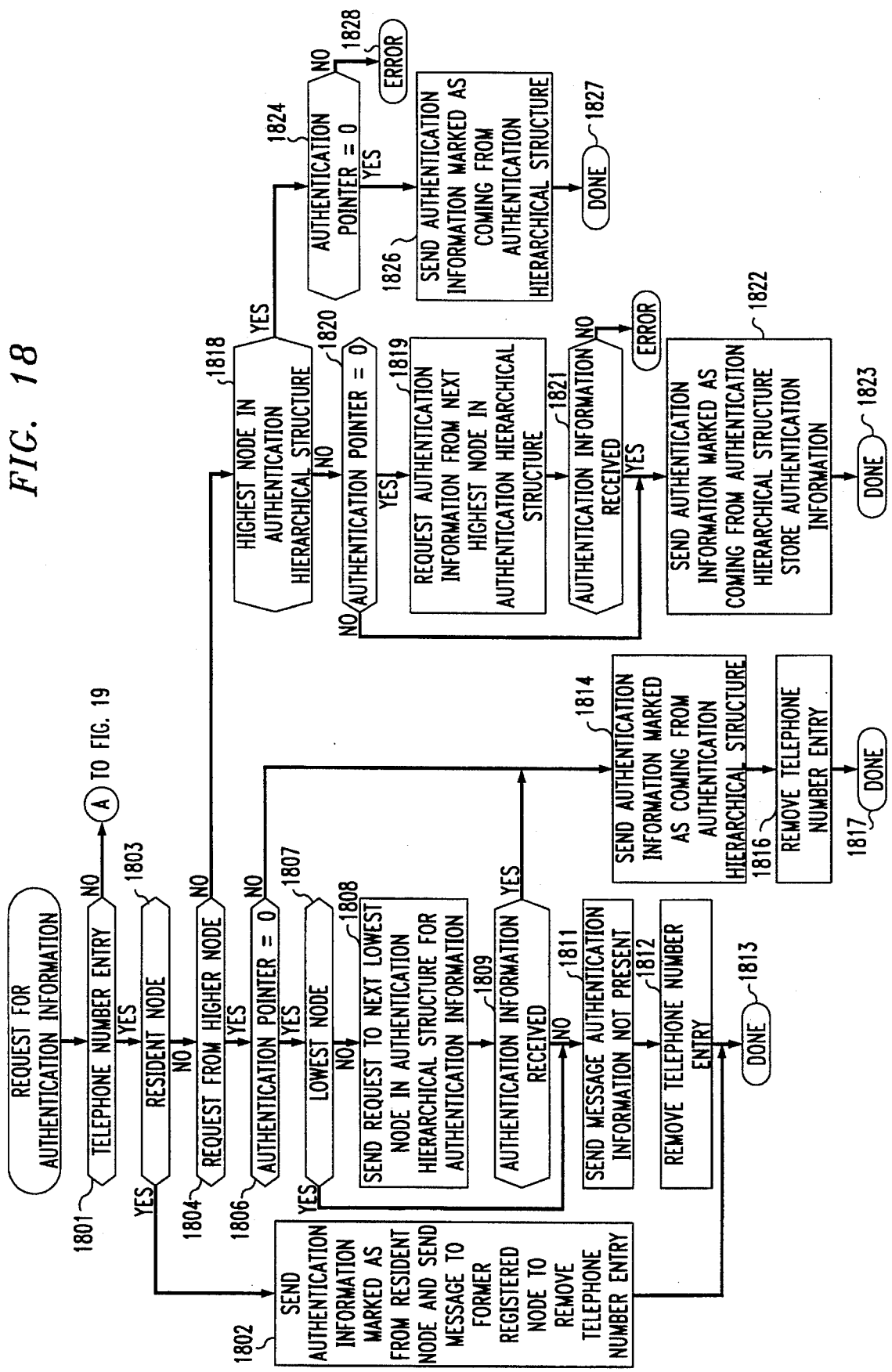
FIGS. 18 and 19 illustrate, in flow chart form, operations performed by a mobility management application in obtaining authentication information.
Figure 19:
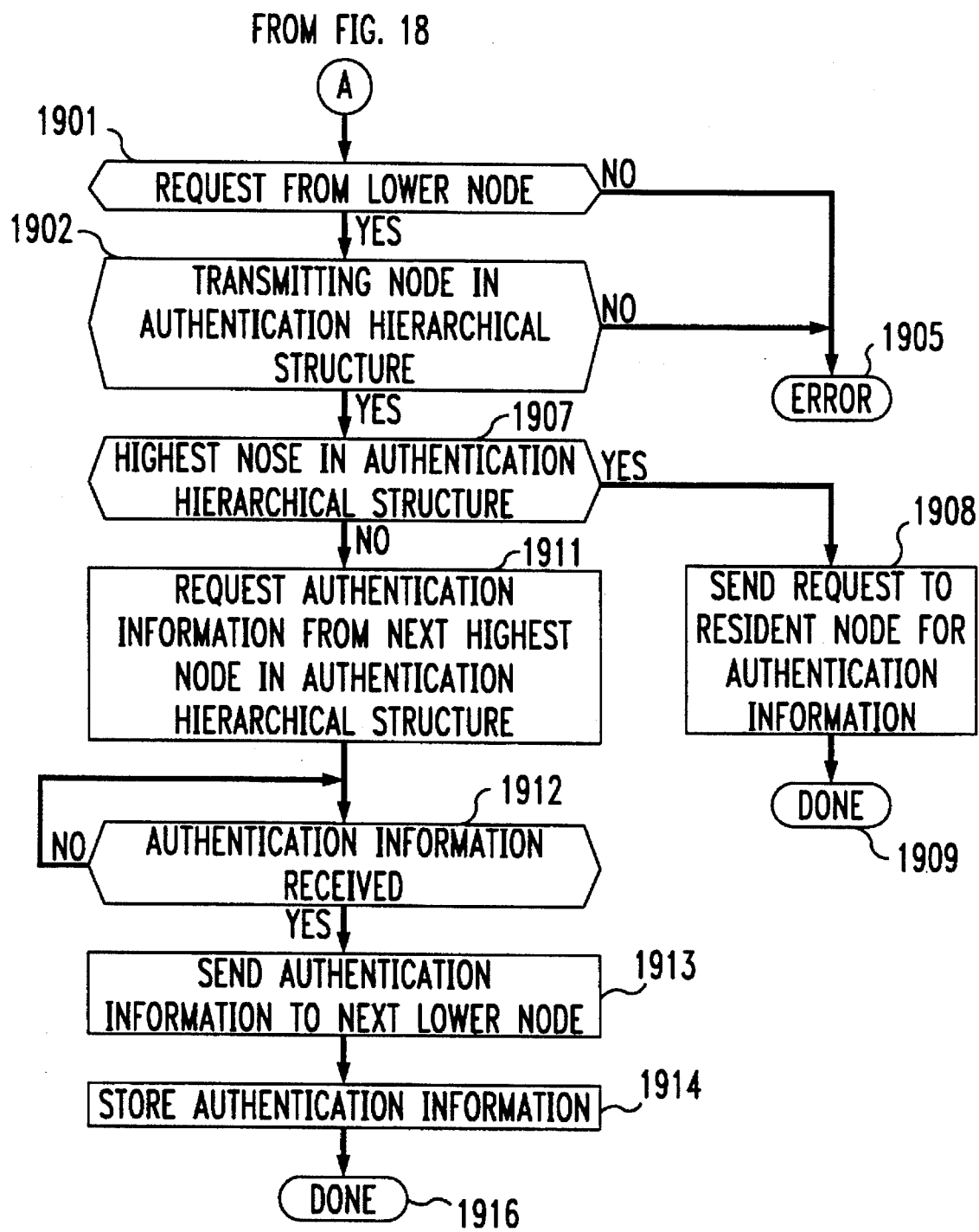

FIGS. 18 and 19 illustrate, in flow chart form, the operations performed by a switching node when the switching node receives a request for authentication information. Decision block 1801 determines if there is a telephone number entry in the mobility table. Such an entry indicates that the switching node has information concerning the authentication information being requested. If the answer to decision block 1801 is no, control is transferred to FIG. 19. If a telephone number entry is found by decision block 1801, this indicates that the switching node is either the resident switching node or part of an authentication hierarchical structure with respect to that particular telephone number. Upon receiving control from decision block 1801, when the answer is yes, decision block 1803 determines if the switching node is the resident switching node. If it is the resident switching node, block 1802 sends the authentication information to the switching node marked as having a telephone being registered on it with the authentication information marked as coming from the resident switching node. Further, the resident switching node transmits a message to the switching node that had formally registered the telephone requesting it to remove the telephone number entry from its mobility table. After these two messages are sent, control is transferred to block 1813.

Returning to decision block 1803, if the answer is no, control is transferred to decision block 1804 which determines whether the request is coming from above or below the switching node in the authentication hierarchical structure. If the request is coming from above, control is transferred to decision block 1806. The latter decision block examines the authentication pointer associated with the telephone number in the mobility table. If the pointer is not equal to zero indicating that the authentication information is present on the switching node, control is transferred to block 1814. The latter block transmits the authentication information to the requesting higher switching node marking this information as coming from the authentication hierarchical structure. Block 1816 then removes the telephone entry before transferring control to block 1817. Since the request for the authentication information had come from the higher switching node, this indicates that the PCS telephone is being registered on another switching node, and the telephone number entry should be removed for the present switching node.

Returning to decision block 1806, if the authentication pointer is zero, decision bock 1807 is executed which determines if the present switching node is the lowest switching node in the authentication hierarchical structure. If it is the lowest switching node and the authentication information is not present, then a message is sent back by block 1811 indicating that the authentication information is not present. Block 1812 then removes the telephone number entry before transferring control to block 1813. If the answer to decision block 1807 is no, control is transferred to block 1808 which request the authentication information from the next lowest switching node in the authentication hierarchical structure. Decision block 1809 awaits the response for this request. If the authentication information is not received, control is transferred to block 1811 which has already been discussed. If the authentication information is received, control is transferred to block 1814 whose operations have already been discussed.

Returning to decision block 1804 which determined whether the request for the authentication information is from above or below the present switching node. If the request was from below the present switching node, control is transferred to decision block 1818. The latter decision block determines whether the present switching node is the highest switching node in the authentication hierarchical structure. If the present switching node is the highest switching node, then control is transferred to decision block 1824. The latter decision block determines if the authentication information is present. If the authentication information is present, this is an error and control is transferred to block 1828 for error processing. The reason that it is an error is that the authentication information should have been present within the authentication hierarchical structure and the highest switching node in that structure is the last switching node tested. If the authentication information is present, control is transferred to block 1826 which transmits the authentication information to the requesting switching node as coming from the authentication hierarchical structure and transfers control to block 1827.

Returning to decision block 1818, if the present switching node is not the highest switching node in the authentication hierarchical structure, control is transferred to decision block 1820 which determines if the authentication information is present on the switching node. If the answer is yes, control is transferred to block 1822 whose operation is described below. If the answer is no, control is transferred to block 1819 which request the authentication information from the next highest switching node in the authentication hierarchical structure and transfers control to decision block 1821 to wait the arrival of authentication information. If authentication information is not received, this is an error for the same reasons as it was an error with respect to block 1828. If the authentication information is received, control is transferred to block 1822 which sends the authentication information to the requesting switching node after marking it as having come from the authentication hierarchical structure. Further, block 1822 transfers control to block 1823 which stores the authentication information and updates the authentication pointer in the mobility table to point to this information.

Returning to decision block 1801, if there is not a telephone number entry for the PCS telephone for whom authentication information is being requested, control is transferred to decision block 1901 of FIG. 19 which determines if the requesting switching node is a lower switching node in the authentication hierarchical structure. If it is not a lower switching node, control is transferred to block 1905 for error processing. If it is a lower switching node, control is transferred to decision block 1902 which determines if the requesting switching node is in an authentication hierarchical structure with the present switching node. If the answer to decision block 1902 is no, control is transferred to block 1905. If the answer to decision block 1902 is yes, control is transferred decision block 1907 which determines if the present switching node is the highest switching node in the authentication hierarchical structure. If it is the highest switching node, control is transferred to block 1908 which request the authentication information from the resident switching node before transferring control to 1909. Note, that the resident switching node sends the information directly to the switching node which is registering the PCS telephone. Returning to decision block 1907, if the answer is no, block 1911 requests the authentication information from the next highest switching node in the authentication hierarchical structure. Decision block 1912 awaits for the authentication information to be received and once received transfers control to block 1913 which sends the authentication information to the next lower switching node which was the requesting switching node. Block 1914 stores the authentication information and transfers control to block 1916.

Figure 20:
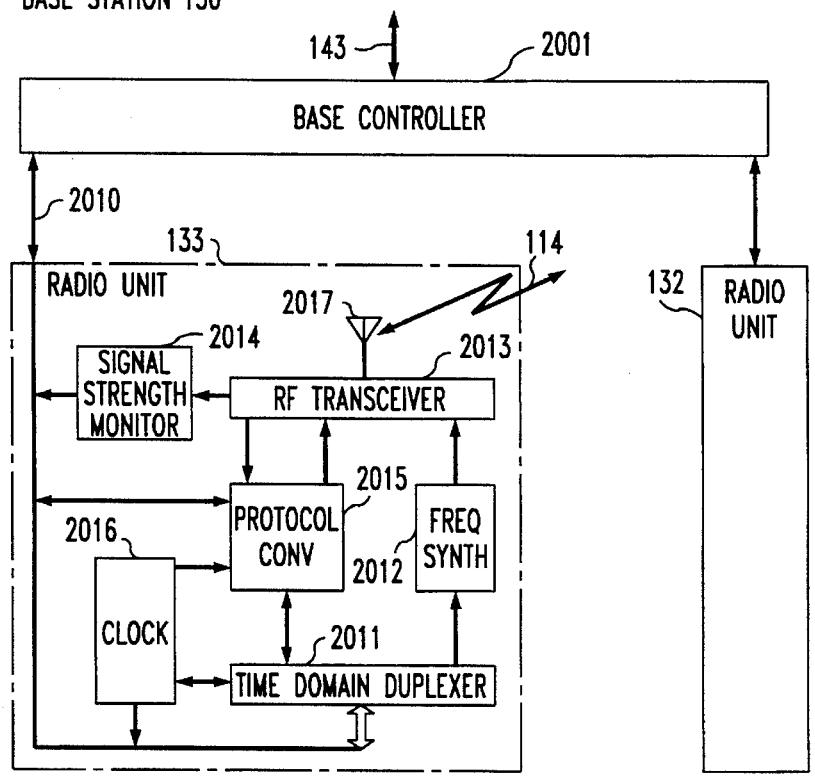
FIG. 20 illustrates a block diagram of a base station.

FIG. 20 illustrates, in greater detail, base station 130. Base controller 2001 controls the operations of radio units 132 through 133. Radio unit 133 is shown in detail, and the other radio units are similar in design. Radio unit 133 includes clock 2016 for providing synchronization to Time Domain Demultiplexer (TDD) 2011 and protocol converter 2015. Radio unit 133 also includes radio frequency (RF) transceiver 2013, antenna 2017 and frequency synthesizer 2012. Transceiver 2013 comprises both an RF transmitter and an RF receiver. Transceiver 2013 demodulates voice signals and control signals transmitted by a mobile unit and couples the voice signals via protocol converter 2015 to base controller 2001 via link 2010. Base controller 2001 provides all control for radio unit 133 via bus 2010. Control signals received from transceiver 2013 are transferred through protocol converter 2015 to base controller 2001 via bus 2010. Protocol converter 2015 is also responsive to digitally encoded voice signals received via bus 2010 from base controller 2001 to convert those digital voice signals into the format utilized for transmission to a mobile unit. Signal strength monitor 2014 is responsive to a signal from RF transceiver 2013 to arrive at a digital value representing the signal strength being received by RF transceiver 2013 and to transmit this digital value to base controller 2001 via bus 2010.

Figure 21:
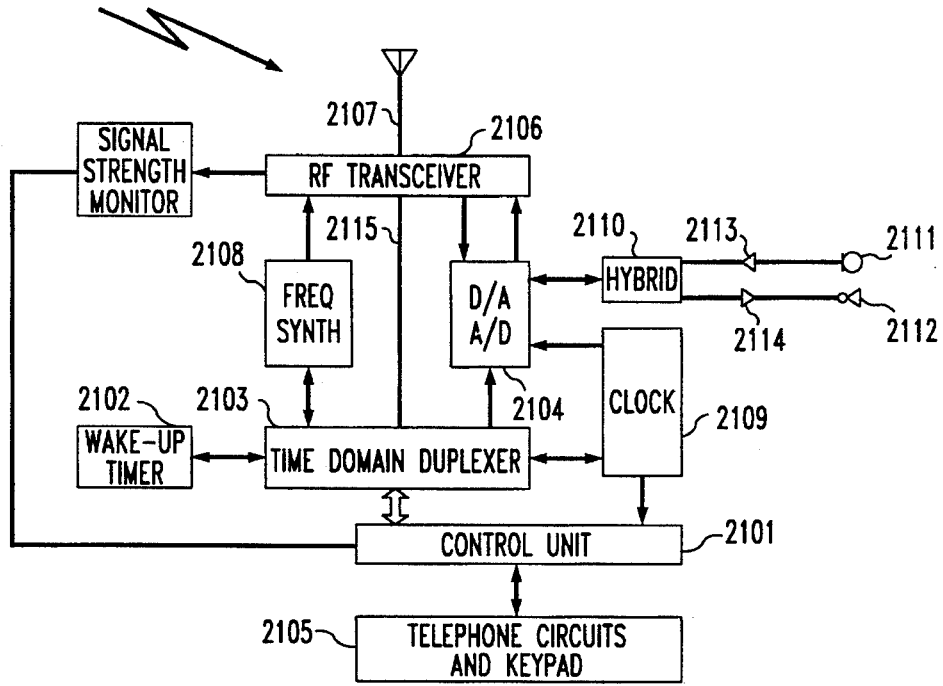
FIG. 21 illustrates a block diagram of a PCS telephone.

FIG. 21 illustrates PCS telephone 168 in greater detail. Components in this unit include control unit 2101, wake-up timer 2102, and clock 2109 for providing synchronization to: (1) control unit 2101, (2) Time Domain Duplexer (TDD) 2103, and (3) combined digital-to-analog and analog-to-digital (D/A+A/D) converter 2104. Also included in mobile unit 105 are RF transceiver 2106, antenna 2107 and frequency synthesizer 2108. Telephone circuits and keypad section 2105 permits dialing telephone digits and actuating control keys for placing and receiving telephone calls. Control unit 2101 performs control function including registration. Control unit 2101 stores the SPID including the resident switching node number in an internal memory and is responsive to a request from a switching node received via a base station to transmit the SPID including the resident switching node number to the requesting switching node.

Transceiver 2106 comprises both an RF transmitter and an RF receiver. Transceiver 2106 demodulates voice signals transmitted by a base station and couples these signals via the D/A section of converter 2104 and hybrid 2110 on to loudspeaker 2112. Transceiver 2106 receives its input analog speech signals from microphone 2111. These analog speech signals are coupled to the transceiver via hybrid 2110 and the A/D section of converter 2104. Converter 2104 converts the analog signals to digital signals which are then transmitted to RF transceiver 2106. Conventional amplifiers 2113 and 2114 are employed for amplifying the analog speech signals obtained from microphone 2111 and provided to loudspeaker 2112.

It is to be understood that the above-described embodiments are merely illustrative of principles of the invention and that other arrangements may be devised by those skilled in the art without departing from the spirit or scope of the invention.

I claim:

1. A method of distributing authentication information in a mobile telecommunication system having a plurality of switching nodes, comprising the steps of:

storing authentication information for a mobile telephone permanently by a resident switching node to which the mobile telephone is permanently assigned;

transmitting a copy of the authentication information to a first non-resident switching node upon the mobile telephone registering on the first non-resident switching node;

storing the copy of the authentication information on the first non-resident switching node;

continuing to store the authentication information on the first non-resident switching node switching after the mobile telephone re-registers on the resident switching node; and removing the copy of the authentication information from the first non-resident switching node after the mobile telephone registers on a second non-resident switching node.

2. The method of claim 1 wherein the step of transmitting comprises the step of requesting the copy of the authentication information from the resident switching node by the first non-resident switching node.

3. The method of claim 2 wherein the step of removing comprises the step of communicating a message by the resident switching node to the first non-resident switching node to request the removal of the copy of the authentication information.

4. The method of claim, 1 further comprises the step of arranging the first non-resident switching node in an authentication hierarchical structure with a set of the plurality of switching nodes; and storing the copy of the authentication information on another one of the set of switching nodes of the authentication hierarchical structure;

continuing to store the authentication information on the other one of the set of switching nodes after the mobile telephone re-registers on the resident switching node; and removing the copy of the authentication information from the other one of the set of switching nodes after the mobile telephone registers on the second non-resident switching node that is not part of the authentication hierarchical structure.

5. The method of claim 4 wherein the step of removing the copy of the authentication information on the other one of the set of switching nodes comprises the step of communicating a message by the resident switching node to the first non-resident switching node to request the removal of the copy of the authentication information; and communicating a second message to the other one of the set of switching nodes to request that the other one of the set of switching nodes remove the copy of the authentication information.

6. An apparatus for distributing authentication information in a mobile telecommunication system comprising a plurality of switching nodes, comprising:

means for storing authentication information for a mobile telephone permanently by a resident switching node to which the mobile telephone is permanently assigned;

means for transmitting a copy of the authentication information to a first non-resident switching node upon the mobile telephone registering on the first non-resident switching node;

means for storing the copy of the authentication information on the first non-resident switching node;

means for continuing to store the authentication information on the first non-resident switching node switching after the mobile telephone re-registers on the resident switching node; and means for removing the copy of the authentication information from the first non-resident switching node after the mobile telephone registers on a second non-resident switching node.

7. The apparatus of claim 6, wherein the means for transmitting comprises means for requesting the copy of the authentication information from the resident switching node by the first non-resident switching node.

8. The apparatus of claim 7 wherein the means for removing comprises the step of communicating a message by the resident switching node to the first non-resident switching node to request the removal of the copy of the authentication information.

9. The apparatus of claim 6 further comprises means for arranging the first non-resident switching node in an authentication hierarchical structure with a set of the plurality of switching nodes; and means for storing the copy of the authentication information on another one of the set of switching nodes of the authentication hierarchical structure;

means for continuing to store the authentication information on the other one of the set of switching nodes after the mobile telephone re-registers on the resident switching node; and means for removing the copy of the authentication information from the other one of the set of switching nodes after the mobile telephone registers on the second non-resident switching node that is not part of the authentication hierarchical structure.

10. The apparatus of claim 9 wherein the means for removing the copy of the authentication information on the other one of tile set of switching nodes comprises means for communicating a message by the resident switching node to the first non-resident switching node to request the removal of the copy of the authentication information; and means for communicating a second message to the other one of the set of switching nodes to request that the other one of the set of switching nodes remove the copy of the authentication information.

* * * * *